(12) United States Patent
Rudelt et al.

(10) Patent No.: US 7,168,241 B2
(45) Date of Patent: Jan. 30, 2007

(54) DEVICE FOR INTRODUCING FUEL INTO AN EXHAUST LINE

(75) Inventors: Josef Rudelt, Aichwald (DE); Gerd Gaiser, Reutlingen (DE)

(73) Assignee: J. Eberspächer GmbH & Co. KG, Esslingen (DE)

( * ) Notice: Subject to any disclaimer, the term of this patent is extended or adjusted under 35 U.S.C. 154(b) by 0 days.

(21) Appl. No.: 11/091,174

(22) Filed: Mar. 28, 2005

(65) Prior Publication Data

US 2005/0210869 A1   Sep. 29, 2005

(30) Foreign Application Priority Data

Mar. 29, 2004 (DE) ............ 10 2004 015 805

(51) Int. Cl.
  *F01N 3/00*  (2006.01)
(52) U.S. Cl. ............... 60/286; 60/295; 60/298; 60/303; 60/320; 239/128; 239/129; 239/132; 239/132.3; 239/132.5
(58) Field of Classification Search .......... 60/286, 60/295, 298, 301, 303, 320; 239/128, 129, 239/132, 132.1, 132.2, 132.3, 132.5
See application file for complete search history.

(56) References Cited

U.S. PATENT DOCUMENTS

| 5,522,218 | A  |   | 6/1996  | Lane et al. |
| 5,605,042 | A  | * | 2/1997  | Stutzenberger ............ 60/286 |
| 6,192,677 | B1 | * | 2/2001  | Tost ........................ 60/286 |
| 6,279,603 | B1 | * | 8/2001  | Czarnik et al. ........... 137/339 |
| 6,513,323 | B1 |   | 2/2003  | Weigl et al. |
| 6,539,708 | B1 |   | 4/2003  | Hofmann et al. |
| 6,814,303 | B2 | * | 11/2004 | Edgar et al. ............... 239/128 |
| 2003/0140621 | A1 |  | 7/2003 | Khair et al. |
| 2003/0230076 | A1 |  | 12/2003 | Kwon |

FOREIGN PATENT DOCUMENTS

| CH | 152 348       | 1/1932  |
| DE | 349770        | 3/1922  |
| DE | 30 46 258 A1  | 9/1981  |
| DE | 44 36 397     | 4/1996  |
| DE | 195 81 135    | 11/1996 |
| GB | 2064983       | 6/1981  |
| JP | 9-96212       | 4/1997  |
| JP | 2000291429 A  | 10/2000 |
| WO | WO99/41492    | 8/1999  |
| WO | WO00/66885    | 11/2000 |
| WO | WO03/084647   | 10/2003 |

* cited by examiner

*Primary Examiner*—Binh Q. Tran
(74) *Attorney, Agent, or Firm*—Collard & Roe, P.C.

(57) ABSTRACT

The present invention relates to a device (1) for introducing fuel into an exhaust line (4) of an internal combustion engine, in particular in a motor vehicle, with a fuel injector (2) for injecting fuel under injection pressure into the exhaust line (4) through a radial opening (5) in a pipe section (3) of the exhaust line (4).

Figure 1:
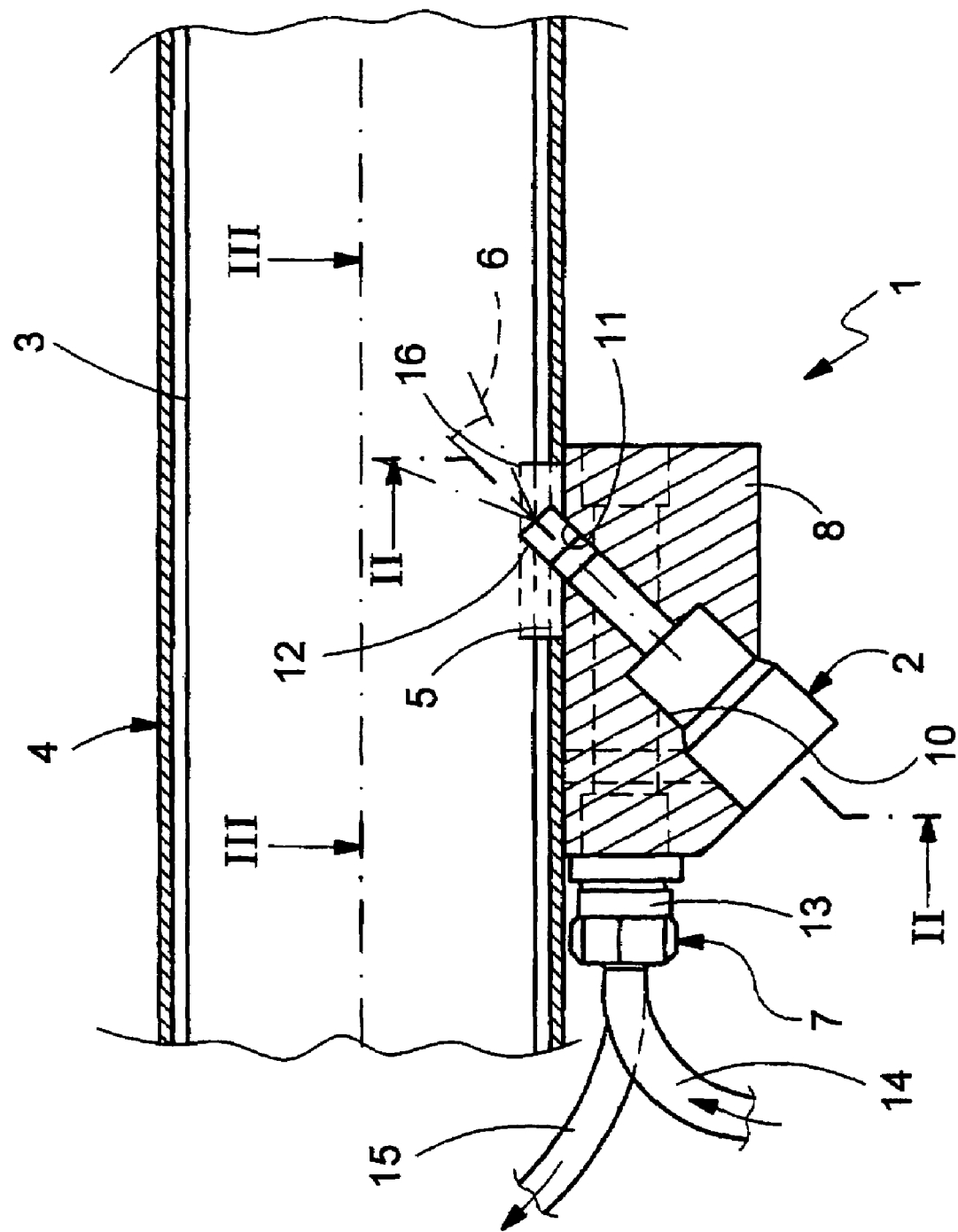

To improve the efficiency of such a device (1), the fuel injector (2) is connected to a coolant circulation system (7) in a manner suitable to transfer heat.

9 Claims, 3 Drawing Sheets

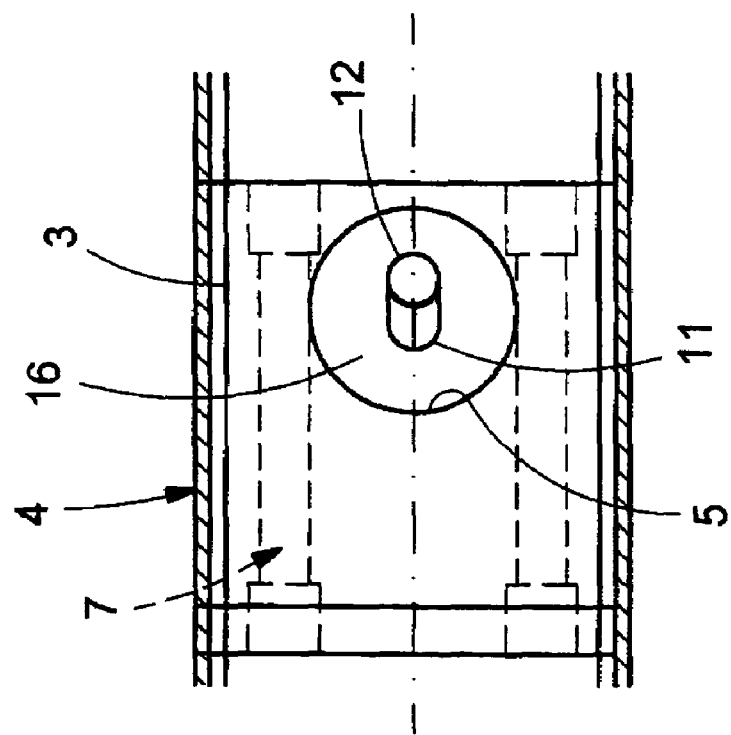
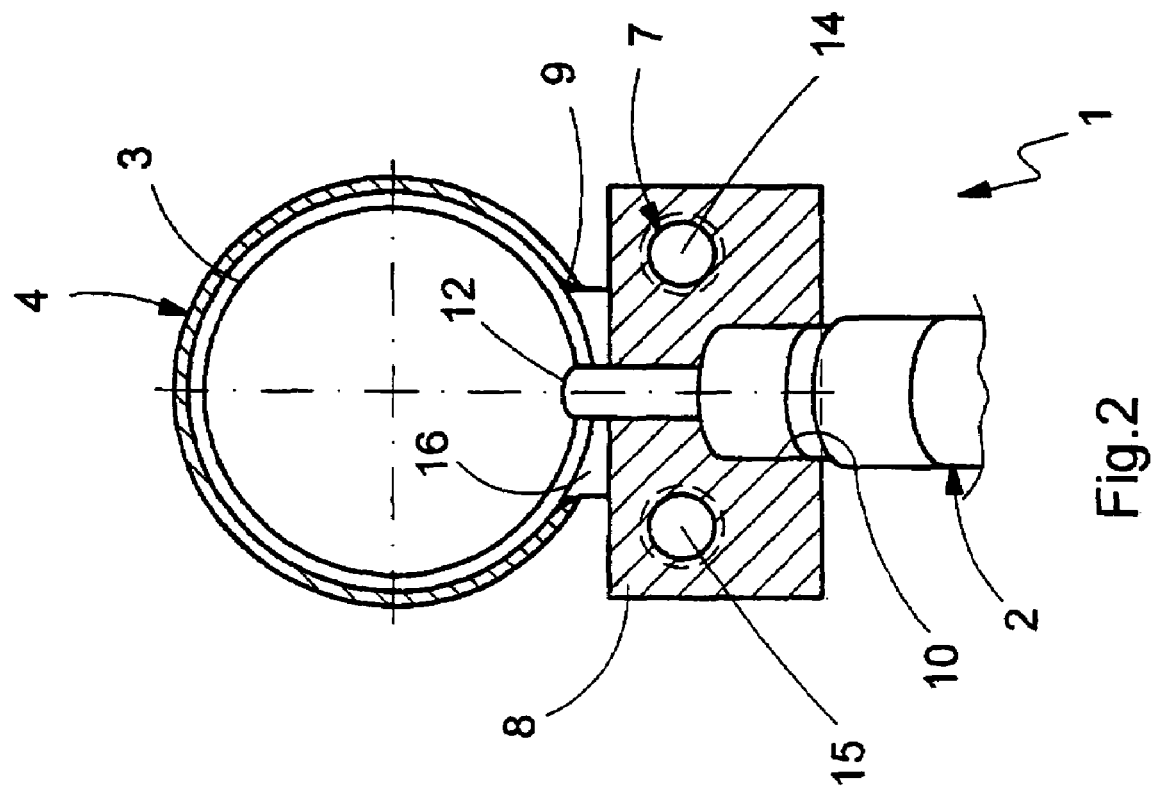
Fig.3
Fig.2

DEVICE FOR INTRODUCING FUEL INTO AN EXHAUST LINE

CROSS REFERENCE TO RELATED APPLICATIONS

Applicant claims priority under 35 U.S.C. § 119 of German Application No. 10 2004 015 805.3 filed on Mar. 29, 2004.

The present invention relates to a device for introducing fuel into an exhaust line of an internal combustion engine, in particular in a motor vehicle, having the features of the preamble of Claim 1.

Such a device is known, for example, from DE 30 46 258 A1 and includes a fuel injector for injecting fuel under an injection pressure into the exhaust line through a radial opening in a pipe section of the exhaust line.

Other devices for introducing fuel into an exhaust line through a fuel injector are already known from U.S. Pat. 2003/0140621 A1 and U.S. Pat. 2003/0230076 A1.

To reduce particulate emissions by internal combustion engines, especially in motor vehicles, it is known in general, e.g., from the documents cited above, that a particulate filter may be provided in the exhaust line of the internal combustion engine. Such a particulate filter is usually also referred to as a particulate filter because the particulate matter entrained in the exhaust, especially in diesel engines, is primarily soot.

During operation of the internal combustion engine, the particulate matter filtered out accumulates in the respective particulate filter, which gradually results in an increase in backpressure in flow through the particulate filter. Accordingly, it is customary to regularly subject the particulate filter to a regeneration process in which the particulate matter deposited in the filter is burned off. To be able to initiate such a combustion reaction for regeneration of the particulate filter, the temperature in the particulate filter and/or in the exhaust gas supplied to the particulate filter must be increased.

Essentially such a temperature increase in the exhaust gas can be implemented by measures involving the engine. For example, extra fuel may be injected into the combustion chambers of the internal combustion machine with the help of a suitably designed injection device at such a late point in time that this fuel cannot be burned and the unburned fuel enters the exhaust line. An oxidation catalyst which catalyzes a reaction of the extra injected fuel quantity is then expediently provided upstream from the particulate filter. This results in a highly exothermic reaction, yielding the desired rise in exhaust temperature. Such measures involving the engine are comparatively inexpensive to implement but they also have certain disadvantages. For example, late post-injection of fuel can lead to thinning of the engine lubricant oil and to inadequate lubrication of the pistons in the cylinders.

To prevent this, devices of the type mentioned above are used, permitting injection of fuel downstream from the engine with the help of a fuel injector.

The present invention is concerned with the problem of providing an improved embodiment of a device of the type defined in the preamble such that it will be characterized in particular by a longer lifetime.

This problem is solved according to this invention by the object of the independent claim. Advantageous embodiments are the object of the dependent claims.

This invention is based on the general idea of cooling the fuel injectors. Through cooling of the fuel injector, the heat supplied to the fuel injector via the exhaust line during operation of the internal combustion engine can be dissipated, so that the fuel injector can be operated at a temperature level which is considerably below the temperature level of the exhaust line. This has various advantages. First, the material stress within the fuel injector is reduced, so that it has a longer lifetime. Secondly, the risk of spontaneous combustion of fuel in the fuel injector is greatly reduced. Furthermore, one valve of the fuel injector can be positioned relatively close to an injector head having at least one injector orifice, thereby reducing the dead volume of fuel between the at least one injector orifice and said valve. In the case of uncooled fuel injectors, a relatively great distance must be maintained between the at least one injector orifice and the aforementioned valve so as not to have a negative effect on the functioning of the valve due to the high temperatures. As a result, the dead volume of fuel is increased when the fuel injector is not cooled. The greater this dead volume, the greater the inaccuracy in dosing the additional fuel supply into the exhaust line. Accordingly, the cooled fuel injector ultimately also leads to an improved dosability of the additional fuel injected.

Cooling of the fuel injector is accomplished according to this invention with the help of a coolant circulation system that is connected in a suitable way to the fuel injector to permit heat exchange. A section of the coolant circulation may expediently be integrated into the fuel injector. Especially intense cooling of the fuel injector can be implemented in this way.

In another advantageous embodiment, the fuel injector may be mounted on an injector mount which is in turn attached to the pipe section, and then the injector mount is connected to the coolant circulation in a manner suitable for heat transfer, so that the fuel injector is connected indirectly through or via the injector mount to the coolant circulation in a manner suitable for heat transfer. With this design, the injector mount is thus cooled directly by the coolant circulation while the fuel injector attached to it is cooled only indirectly via the injector mount by the coolant circulation. This design has the advantage that a traditional, i.e., an expensive fuel injector can be used so that the injector mount is more or less a type of adapter for implementing cooling of the fuel injector. In addition, a corresponding design of the injector mount may also implement intense cooling for the fuel injector.

In a refinement of the present invention, the injector mount may have an injector receptacle which passes at least radially through the injector mount and opens in the radial opening of the pipe section, and then the fuel injector is inserted into this injector receptacle, so that the injector head of the fuel injector containing at least one injector orifice is situated in the area of the radial opening. With this design, the fuel injector is surrounded completely across its longitudinal extent by the injector mount within the injector receptacle, namely up to its injector head. This makes it possible to implement intense cooling of the fuel injector because the injector mount can be brought in contact with the fuel injector along a relatively large surface area.

Here again a variant in which a section of the coolant circulation is integrated into the injector mount is preferred, so that especially effective cooling of the injector mount and thus of the fuel injector can be achieved.

Other important features and advantages of this invention are derived from the subclaims, the drawings and the respective description of the figures on the basis of the drawings.

It is self-evident that the features which are mentioned above and are to be explained below can be used not only in the given combination but also in other combinations or even alone without going beyond the scope of the present invention.

A preferred exemplary embodiment of this invention is depicted in the drawings and is explained in greater detail in the following description, where the same reference notation refers to the same or functionality same or similar components.

THE DRAWINGS EACH SHOW SCHEMATICALLY

Figure 4:
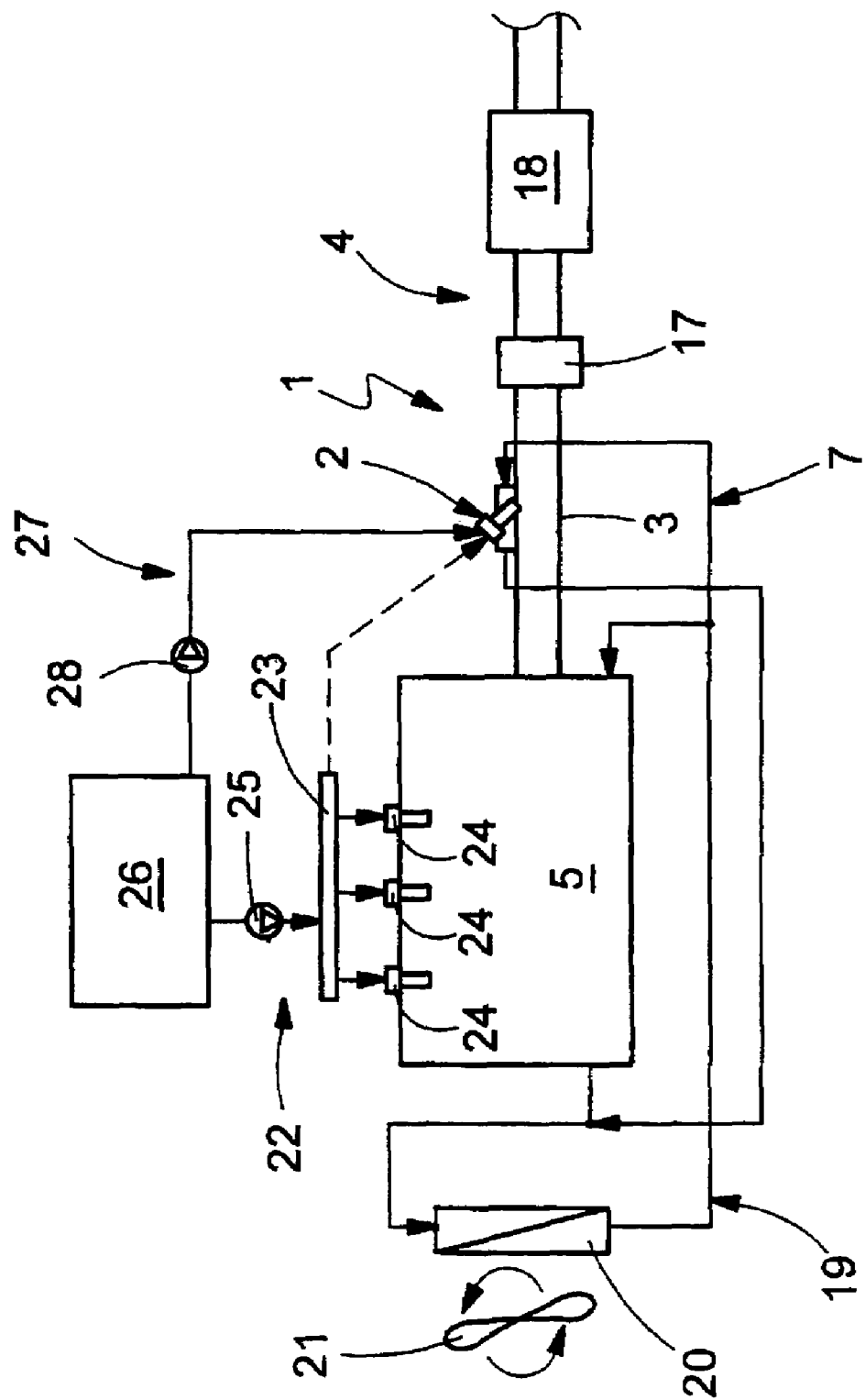

FIG. 1 a greatly simplified longitudinal section through a device according to this invention, FIG. 2 a cross section through the device according to sectional lines II in FIG. 1, FIG. 3 a sectional top view corresponding to the sectional lines III in FIG. 1, FIG. 4 a schematic like a wiring diagram for an arrangement of the inventive device in an internal combustion engine.

According to FIGS. 1 through 3, an inventive device 1 includes a fuel injector 2 and is arranged on a pipe section 3 of an exhaust line 4 of an internal combustion engine 5 shown in FIG. 4 such that the fuel injector 2 can inject fuel into the exhaust line 4 through a radial opening 5, which is provided in the pipe section 3. FIG. 1 shows a spray jet that can be created with the help of the fuel injector 2 and is labeled as 6. The injector 2 is designed to be electrically triggerable and regulable.

According to this invention the fuel injector 2 is cooled. A coolant circulation system 7 to which the fuel injector 2 is connected in a manner suitable to transfer heat serves this purpose. A suitable coolant medium, preferably a liquid coolant, circulates in the usual way in the coolant circulation system 7. Due to the cooling, the thermal stress on the fuel injector 2 which necessarily occurs due to its positioning directly on the exhaust line 4 can be greatly reduced. The coolant circulation system 7 receives heat from the fuel injector 2 and dissipates it via the circulating coolant. This yields an intense cooling effect for the fuel injector 2.

Essentially it is possible to connect the fuel injector 2 directly to the coolant circulation system 7 in a manner suitable to transfer heat. It is especially advantageous then to integrate a section of the coolant circulation system 7 into the fuel injector 2.

However, the embodiment shown here in which the fuel injector 2 is connected indirectly to the coolant circulation system 7 in a manner suitable to transfer heat is preferred. To do so, the device 1 has an injector mount 8 which is mounted on the pipe section 3. This injector mount 8 is preferably welded to the pipe section 3. Corresponding welds can be seen in FIG. 2 where they are labeled as 9. The fuel injector 2 is then mounted on this injector mount 8. In the preferred embodiment illustrated here, the coolant circulation system 7 serves to provide direct cooling of the injector mount 8 and thus indirect cooling of the fuel injector 2 via and/or through the injector mount 8. To this end, the coolant circulation system 7 is connected to the injector mount 8 in a manner suitable to transmit heat. In addition, the fuel injector 2 is attached to the injector mount 8 in such a way that the most intense possible heat transfer can also be established.

The injector mount 8 preferably has an injector receptacle 10 which is shaped to be essentially complementary to the fuel injector 2 and passes radially through the injector mount 8. The injector receptacle 10 may be inclined, as illustrated here in FIG. 1, with respect to a strictly radial direction, i.e., with respect to a radial plane, e.g., by an angle of approximately 45°. Accordingly, the direction in which the injector receptacle 10 passes through the injector mount 8 may also have an axial component in addition to the aforementioned radial component. It is essential that the injector receptacle 10 opens into the radial opening 5 of the pipe section 3 with a mouth end 11.

The fuel injector 2 is then inserted into this injector receptacle 10, especially by pushing or screwing it into the receptacle. The injector receptacle 10 is designed so that an injector head 12 of the fuel injector 2 inserted into the injector receptacle 10 is situated in the area of the radial opening 5. In other words, the injector head 12 is situated inside the mouth end 11 or protrudes beyond it as illustrated in FIG. 1. This injector head 12 includes at least one injector orifice through which the fuel can be sprayed or injected into the interior of the pipe section 3.

With the help of the injector receptacle 10, which is expediently shaped to be complementary to the outside contour with the fuel injector 2, it is possible to achieve contact between the fuel injector 2 and the injector mount 8 over an especially large area, which improves the heat transfer between the fuel injector 2 and the injector mount 8. In particular, such an injector receptacle 10, into which the fuel injector 2 can be inserted with an essentially longitudinal section, necessarily results in the injector mount 8 completely enclosing the fuel injector 2 on the circumference in the longitudinal section inserted into the injector receptacle 10, which permits especially intense thermal coupling.

In addition, the injector mount 8 may be made of a material which has a relatively high thermal conductivity. For example, the injector mount 8 may be made of steel so that it can readily withstand the relatively high temperatures of the exhaust line 4. The injector mount 8 is preferably made of stainless steel to withstand the aggressive environment, in particular the corrosive environment of the exhaust line 4. Likewise, it is fundamentally possible to manufacture the injector mount 8 of another heat-conducting material such as copper or brass. In addition, an integral design in which the injector mount 8 is manufactured in one piece is advantageous for a good thermal conductivity of the injector mount 8. In this way it is possible to avoid insulating transitional zones which may occur with an engineered injector mount 8.

With the preferred embodiment illustrated here, a section 13 of the coolant circulation system 7 is integrated into the injector mount 8. This partial integration of the coolant circulation system 7 into the injector mount 8 leads to an especially effective cooling of the injector mount 8 and thus the fuel injector 2 which is connected to it in such a way that heat can be transferred.

As shown in FIG. 2 in particular, the section 13 of the coolant circulation system 7 integrated into the injector mount 8 has a forward line 14 and a return line 15, which facilitate the connection of the device 1 and/or the injector mount 8 into the coolant circulation system 7.

As shown in FIGS. 1 through 3, the injector mount 8 is equipped with a plug-type section 16 on a side facing the pipe section 3, this plug-type section preferably being inserted into the radial opening 5 of the pipe section 3. The plug-type section 16 is expediently shaped to be complementary on the peripheral edge with the radial opening 5 so that the plug-type section 16 more or less fills up the radial opening 5 in the installed state. The mouth end 11 of the injector receptacle 10 is situated in this plug-type section 16.

Due to the selected inclination of the injector receptacle 10 with respect to a radial plane, the mouth end 11 is in the form of an elongated hole on the end face of the plug-type section which faces the interior of the pipe section 3, as can be seen in FIG. 3.

The inventive device 1 serves to introduce fuel into the exhaust line 4 of the internal combustion engine 5 which may be installed in a motor vehicle in particular. According to FIG. 4, in an advantageous application of the inventive device 1, the pipe section 3 on which the device 1 is mounted on the exhaust line 4 may be situated upstream from an oxidation catalyst 17 which is in turn upstream from a particulate filter 18. The particulate filter 18 serves to filter out the particulate matter that is entrained in the exhaust of the internal combustion engine 5 to remove the particulate matter from this exhaust. To be able to regenerate the particulate filter 18, a certain quality of fuel, which is under a predetermined injection pressure here, is injected into the exhaust line 4 with the help of the device 1. This fuel thus enters the oxidation catalyst 17, where it is reacted. Heat is released in the process, raising the temperature of the exhaust gas. Subsequently there is also a rise in temperature in the particulate filter 18. If the temperature is high enough, a burn-off of the particulate matter, especially carbonaceous particles, is initiated in the particulate filter 18. The burn-off process initiated may proceed spontaneously because it also takes place with the release of heat. This means that after initiation of the burn-off process, the injection of fuel with the help of device 1 can be terminated.

FIG. 4 shows a preferred embodiment in which the coolant circulation system 7 with the help of which the fuel injector 2 is cooled is connected to a coolant circulation 19 of the internal combustion engine 5. This coolant circulation 19 serves to cool the internal combustion engine 5 and has a corresponding cooler 20 which can usually be acted upon by a fan 21. The complexity for implementation of the cooling of the fuel injector 2 is thus greatly reduced because a completely independent cooling system is therefore not necessary to this extent.

A modern internal combustion engine 5, in particular a diesel engine, is usually equipped with a fuel supply system 22 which operates according to the so-called common-rail principle. To do so, the fuel supply system 22 includes at least one common fuel high-pressure line 23 which supplies several, preferably all, fuel injectors 24 of the internal combustion engine 5 with fuel under a high pressure in parallel. The high-pressure line 23 is in turn supplied by means of an injector pump 25 which is connected to a fuel reservoir 26, i.e., a fuel tank. The fuel injectors 24 of the internal combustion engine 5 serve to inject fuel into the combustion chambers of the internal combustion engine 5 in the traditional manner.

In contrast with that, the fuel injector 2 of the inventive device 1 may be connected to an additional fuel supply system 27 which is independent of the fuel supply system 22 of the internal combustion engine 5. For example, such an additional fuel supply system 27 contains a suitable pump 28 which generates the required injection pressure. Since the same fuel is expediently used for injection into the exhaust line as for operation of the internal combustion engine 5, the additional fuel supply system 27 and/or its pump 28 is also connected to the fuel reservoir 26.

According to another advantageous embodiment, the fuel injector 2 of the inventive device 1 may also be connected to the high-pressure line 23 of the fuel supply system 22 of the internal combustion engine 5. An independent additional fuel supply system 27 which is provided only for the device 1 is then superfluous, which greatly reduces the cost for implementation of the present invention.

Due to the indirect cooling of the fuel injector 2 via its injector mounts 8, it is also possible to use a conventional fuel injector 2 for injection of the fuel, e.g., a direct gasoline injector which normally protrudes into the combustion chamber. In particular, a fuel injector 2 which otherwise serves to inject fuel into a combustion chamber of the internal combustion engine 5 may in particular also be used. In the extreme case, the fuel injector 2 of the device 1 may thus be identical in design to one of the fuel injectors 24 of the internal combustion engine 5.

The invention claimed is:

1. A device for introducing fuel into an exhaust line of an internal combustion engine, the device comprising a fuel injector for injecting fuel under an injection pressure into the exhaust line through a radial opening in a pipe section of the exhaust line, wherein the fuel injector is connected to a coolant circulation system in a manner suitable for heat transfer, wherein the fuel injector is mounted on an injector mount, said injector mount beings mounted in turn on the pipe section, the injector mount is connected to the coolant circulation system in a manner suitable to transfer heat, so the fuel injector is connected not directly, but indirectly through or via the injector mount to the coolant system in a manner suitable for heat transfer, the injector mount comprises an injector receptacle which passes radially through the injector mount and opens into the radial opening of the pipe section, the fuel injector is inserted into the injector receptacle so that an injector head of the fuel injector is in the area of the radial opening, the coolant circulation system is connected to a coolant circulation of the internal combustion engine, the fuel injector is connected to a fuel supply system of the internal combustion engine, and the fuel injector is supplied with fuel from a fuel reservoir from which also the internal combustion engine is supplied with fuel.

2. The device according to claim 1, wherein a section of the coolant circulation system is integrated into the fuel injector.

3. The device according to claim 1, wherein the injector mount has a plug-type section which is inserted into the radial opening of the pipe section and in which there is a mouth end of the injector receptacle.

4. The device according to claim 1, wherein at least one section of the coolant circulation system is integrated into the injector mount.

5. The device according to claim 1, wherein the injector mount is made of a material having a relatively high thermal conductivity.

6. The device according to claim 5, wherein the injector mount is made of steel or stainless steel.

7. The device according to claim 1, wherein the injector mount is manufactured in one piece.

8. The device according to claim 1, wherein the injector mount is welded to the pipe section.

9. The device according to claim 1, wherein the fuel injector is connected to a common fuel high-pressure line of a common-rail system.

* * * * *

UNITED STATES PATENT AND TRADEMARK OFFICE
CERTIFICATE OF CORRECTION

PATENT NO. : 7,168,241 B2 Page 1 of 1
APPLICATION NO. : 11/091174
DATED : January 30, 2007
INVENTOR(S) : Rudelt et al.

It is certified that error appears in the above-identified patent and that said Letters Patent is hereby corrected as shown below:

In particular, in Column 6, line 23, (Line 10 of Claim 1) please change the word "beings" to correctly read: --being--.

Signed and Sealed this

Tenth Day of April, 2007

JON W. DUDAS
*Director of the United States Patent and Trademark Office*